United States Patent

[11] 3,601,897

| [72] | Inventor | Georg Muller, deceased<br>late of Uznach (by Martha Muller-<br>Schalchili) Uznoch, both Switzerland |
|---|---|---|
| [21] | Appl. No. | 802,763 |
| [22] | Filed | Feb. 25, 1969 |
| [45] | Patented | Aug. 31, 1971 |
| [73] | Assignee | Moswey AG<br>Zurich, Switzerland |
| [32] | Priority | Feb. 27, 1968 |
| [33] | | Switzerland |
| [31] | | 3016/68 |

[54] AXIAL ALIGNMENT ADJUSTMENT APPARATUS
8 Claims, 7 Drawing Figs.

[52] U.S. Cl............................................... 33/172 D,
33/178 R, 33/181 R
[51] Int. Cl........................................................ G01b 5/00
[50] Field of Search............................................ 33/181 A,
185, 172 B, 172 D, 178

[56] References Cited
UNITED STATES PATENTS
2,584,602 2/1952 McKee.......................... 33/178

| 2,679,107 | 5/1954 | Gondek......................... | 33/178 |
| 2,860,418 | 11/1958 | Johnson ........................ | 33/172 D |
| 2,860,419 | 11/1958 | Muller........................... | 33/172 D |
| 3,115,710 | 12/1963 | Blake ............................. | 33/172 D |
| 3,507,047 | 4/1970 | Stadele.......................... | 33/172 D |

Primary Examiner—William D. Martin, Jr.
Attorney—Jacobi, Davidson & Kleeman

ABSTRACT: There is disclosed an axial alignment adjustment apparatus for aligning an object with respect to the axis of rotation of a spindle of a machine tool. According to the invention, there is provided a support or housing which is secured by means of a shaft to the spindle. A slide member, at which there are exchangeably secured by means of a locking device insertable feeler elements, is mounted at this housing so as to be displaceable through a predetermined amount radially with respect to the spindle axis and rotatable about such axis. These displacements can be read-off at a dial gauge through the agency of a feeler or a sensing device provided internally of the housing or support.

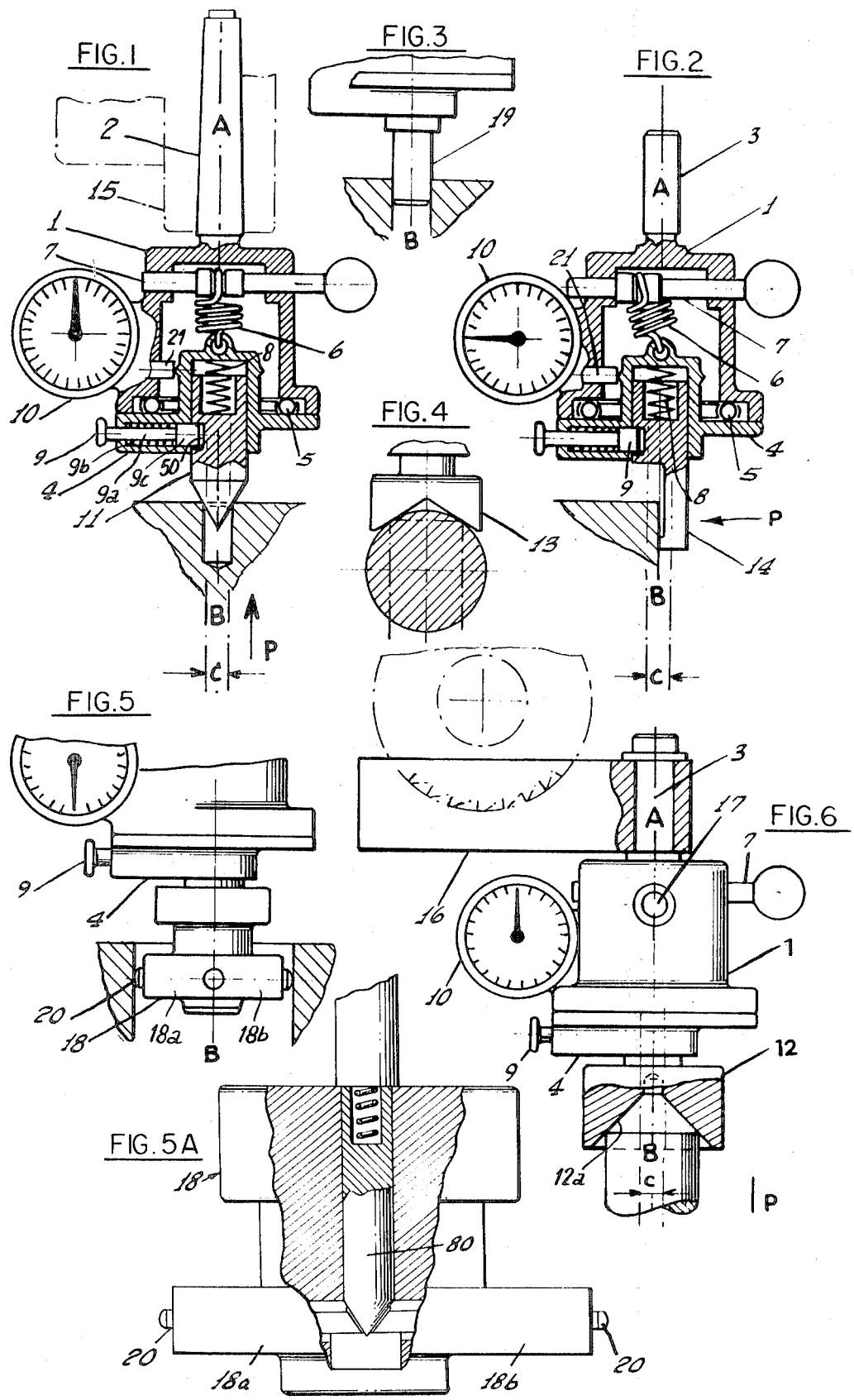

3,601,897

AXIAL ALIGNMENT ADJUSTMENT APPARATUS

BACKGROUND OF THE INVENTION

The present invention relates to a new and improved apparatus which renders possible in an extremely simple, quick and reliable manner the accurate alignment of an object, for instance a dividing apparatus, a clamping or work-locating fixture, a boring device or the machined location of a workpiece, with respect to the axis of rotation of a spindle of a machine tool. The inventive apparatus is also suitable for checking the axial alignment at machines and the accessories, as well as for subsequently checking the radial bearing play of work spindles, and so forth.

SUMMARY OF THE INVENTION

Accordingly, it is a primary objective of the present invention to provide an improved apparatus of the aforementioned type which effectively and reliably fulfills the previously explained purposes.

Another, more specific object of the present invention relates to an improved apparatus for the simple, rapid and reliable accurate alignment of an object with respect to the axis of rotation of a spindle of a machine tool.

Still a further significant object of the present invention relates to the provision of an improved axial alignment adjustment apparatus which is relatively simple in construction, economical to manufacture, extremely easy to use, and permits the rather simple, quick and reliable alignment of an object with respect to the axis of rotation of a spindle of a machine tool as well as for the other purposes heretofore mentioned.

Now, in order to implement these and still further objects of the invention which will become more readily apparent as the description proceeds, the invention contemplates that a slide member is mounted at a housing or support such that it can be displaced by a given amount radially with respect to the spindle axis and is rotatable about such axis. The support or housing is secured to the spindle by means of a shaft, and a number of feeler or testing elements are exchangeably secured by means of a locking device to the slide member. The previously mentioned displacements of the slide member can be read off at a dial gauge through the agency of a sensing or feeler device mounted internally of the support or housing.

BRIEF DESCRIPTION OF THE DRAWING

The invention will be better understood, and objects other than those set forth above will become apparent, when consideration is given to the following detailed description thereof. Such description makes reference to the annexed drawing showing a number of exemplary embodiments of inventive apparatus and wherein:

FIG. 1 is a schematic view, partly in cross section, depicting a preferred embodiment of inventive axial alignment adjustment apparatus;

FIG. 2 depicts the axial alignment adjustment apparatus in a position wherein a transverse force is exerted in radial direction upon the slide member;

FIG. 3 is a fragmentary view showing an insert member in the form of a cylindrical pin or plug as used with the inventive apparatus;

FIG. 4 is a fragmentary view of a portion of the inventive apparatus showing the use of a concave V-shaped insert member used with the inventive apparatus;

FIG. 5 is a fragmentary view of a portion of the inventive apparatus shown an insert member which can be used to determine with extreme accuracy cylindrical bores;

FIG. 5A is a longitudinal sectional view of the apparatus structure shown in FIG. 5;

FIG. 6 shows the inventive apparatus equipped with an insert member having a concave cone portion.

DESCRIPTION OF THE PREFERRED EMBODIMENTS

Describing now the drawing, as will be apparent by inspecting FIGS. 1 and 2, the therein illustrated exemplary embodiment of inventive axial alignment adjustment apparatus essentially consists of a housing or support 1 connected with a work spindle 15. This housing or support 1 is generally either equipped with a conical attachment shaft 2 or with a substantially cylindrical shaft 3, the axis of rotation A of which is identical with that of the work spindle 15. Naturally, it would be possible to use any other type of appropriate attachment, such as a steep cone, flange means and so forth. The front face or end of the housing 1 is constructed to accommodate a plan roller bearing 5, by means of which the slide member 4 which is radially displaceable at all sides through a certain amount C can be moved in the plane of rotation of the support or housing 1.

The slide member 4 is urged by means of a suitable spring 6 against the housing or support 1. Spring 6 is suspended at the housing 1 at a displaceable bolt or spring carrier 7, which normally, as best shown in FIG. 1 remains in its central position, or can be held in such position by a suitable latching device, lock or equivalent structure. In such central or middle position, this spring 6 which is situated in the rotational axis A brings about an automatic approximate alignment of the axes of rotation A and B of the housing 1 and the slide member 4. In order to make it impossible to damage the spring 6 due to rotation of the slide member 4, it would be possible to construct the anchoring eyelet for the spring 6 at the slide member 4 in the form of a separate component which rotates in the rotational axis B, possibly with the intermediate use of an axial ball bearing means.

In order to be able to use the inventive apparatus for as many applications or purposes as possible which frequently arise, there are provided a series of insert members 11 (FIG. 1), 12 (FIG. 6), 13 (FIG. 4), 14 (FIG. 2), 18 (FIG. 5), and 19 (FIG. 3), which are retained at the slide member 4 by the locking device 9. It will be seen that in the embodiment shown, this locking device 9 incorporates a pin member 9a which is subjected to the pressure of a suitable spring 9b, such pin member 9a being radially displaceable in the slide member 4. Furthermore, the pin member 9a has a beveled or tapered end 9c which engages with a recessed portion 50 of the associated insert member in such a fashion that by rotating such insert member the end of the pin can be displaced back for the purpose of releasing the locking action. Furthermore, it will be recognized that between these exchangeable insert members or feelers 11, 12, 13, 14, 18 and 19 and the slide member 4, there is arranged a spring member 8. Such spring member 8 provides a soft and limited contact pressure P against the object or workpiece which is to be checked or tested. This spring force further more brings about a compact or snug bearing of the insert members against the locking pin or bolt 9a of the locking device 9 and further also serves for the ejection of the insert member during the unlocking operation. In actual practice, the spring member 8 can be accommodated in a spring sleeve member which is secured against dropping out. Furthermore, it is here mentioned that the body of housing is provided with openings 17 in such a way that in the direction of the transmission of movement of the slide member upon the indicating device or dial gauge 10 and at right angles thereto suitable nonillustrated aligning rod means can be inserted for facilitating the angular position of the apparatus with respect to the object which is to be adjusted.

The operation of the heretofore described apparatus is in principle as follows: The support or housing 1 is connected with or operably coupled with a machine tool spindle 15 or the like, whereby their axes of rotation coincide. Thereafter, the appropriate insert member provided at the slide member 4 is advanced towards the object to be adjusted until there is achieved a resilient contact which is free of play. Due to the central or middle position of the spring holder or carrier 7 the slide member 4 is located approximately in the central or middle position. Then, in this starting position the dial gauge 10 is adjusted to null or zero, the housing or support 1 rotated through 180°, the read-off difference compensated or corrected by a corrective adjustment, the housing turned back by 990° and correctively compensated or balanced out in the transverse direction until reaching the null-indication, so that the axial alignment of the spindle/support shaft A and slide member/adjustable object B is achieved.

Referring now further to the arrangement of axial alignment adjustment apparatus shown in FIG. 1, it will be seen that such is equipped with an insert member 11 possessing a 60° cone angle or apex. This insert member 11 is suitable for aligning and centering small bores of plane machined surfaces, clean beveled bores or also center punch marks.

FIG. 2 illustrates the manner in which a transverse force can be applied in radial direction to the slide member 4 by displacement of the spring holder or carrier 7 and the suspension point for the tension spring 6. It is similarly aligned with the rotational axis of the sensing or feeler bolt 21 which actuates the indicating device of gauge 10, because the rotational axes of the feeler bolt 21 and spring support 7 are aligned in parallelism with one another, as shown. By means of the insert member 14 which is in physical contact, without play by means of a planar surface disposed in its axis of rotation, with a likewise planar surface of a tool, for instance a vise jaw, a workpiece and so forth due to the previously mentioned transverse force P, it is possible to exactly align this planar surface so as to fall in the shaft/spindle axis A. One proceeds in the manner that the object to be adjusted or aligned is advanced with its planar surface towards the transverse force P until approximately the middle, the gauge is set to zero or null, the support or housing 1 rotated through 180°, the spring holder or carrier 7 displaced to the opposite side, and the read-off difference compensated by carrying out a corrective adjustment.

FIG. 3 illustrates an insert member 19 provided with a cylindrical plug or pin 19a, upon which also there can be pressed a soft ring member which can be accommodated from case to case to the momentarily required diameter.

FIG. 4 depicts an insert member 13 provided with a concave V-shaped (prism) configuration which permits the axes of rotation A or B to be brought to intersect with the rotation or symmetry axis or plane of parallel components. Similarly, only in the opposite sense, it is also possible with a wedge-shaped insert member (convex-V) to adjust with regard to their central plane parallel extending pairs of edges, for instance vise jaws.

FIGS. 5, 5A illustrate an insert member 18 which can determine with great accuracy cylindrical bores. It is constructed as a concentric acting spreading element which functions and is constructed similar to an internal micrometer. In accordance with a preferred physical manifestation, it is constructed in such a way that a spreading element 18a, for the purpose of concentrically determining cylindrical bores, is constructed in a manner that at the head 18b of this element a number of bolt members 20 of exactly equal length and situated in the plane of rotation are pressed towards the outside by the cone apex of a bolt member 80 which is concentrically guided in the axis of rotation of the spreader housing and subjected to spring pressure, as shown in order to generate an exactly concentric form-locking connection with the axis of rotation of the slide member.

FIG. 6 illustrates an insert member 12 having a concave cone 12a which is suitable for axially aligning with regard t their axis of rotation or axis of symmetry clean planar machine components or portions of circular, rectangular, quadrangular, hexagonal, or octagonal, or otherwise symmetrical cross section.

In this Figure there is also illustrated how the previously mentioned or other components can be adjusted to the central plane of a side-milling cutter or pair of milling cutters, a circular saw blade and so forth. For this purpose the support shaft 3 of the device is rotatably secured in a clamping jaw device 16 which is constructed in such a way that the axis of rotation A of the shaft 3 is located in its central plane at each jaw spacing.

With regard to the different insert members heretofore described, it should still further be mentioned that their axes of rotation, axes of symmetry or planes of symmetry must coincide with the axis of rotation of the slide member.

It should be apparent from the foregoing detailed description, that the objects set forth at the outset to the specification have been successfully achieved.

What is claimed is:

1. An axial alignment adjustment apparatus for aligning an object with respect to the axis of rotation of a spindle of a machine tool, comprising a housing, shaft means for securing said housing to said spindle, a slide member, exchangeable feeler elements carried by said slide member, a locking device for exchangeably securing said feeler elements to said slide member, roller bearing means for movably mounting said slide member at said housing, said slide member being mounted at said housing for displacement through a predetermined amount radially with respect to the axis of the spindle and rotatable about such spindle axis, a dial gauge for reading off said displacements of said slide member, and a feeler device mounted internally of said housing for actuating said dial gauge, a spring carrier and a spring means supported thereby for suspending said slide member at said housing in such a fashion that in the central position of said spring carrier under the action of the latter, said slide member is disposed exactly concentrically with respect to the axis of the said housing, whereas upon displacement of said spring carrier out of its central position, said slide member assumes a corresponding position displaced by said predetermined amount with respect to the axis of said housing.

2. An axial alignment adjustment device as defined in claim 1, further including means for resiliently mounting in axial direction said feeler elements at said housing.

3. An axial alignment adjustment device as defined in claim 1, wherein the point of attack of the spring force at the slide member is constructed as smoothly operating axial bearing means.

4. An axial alignment adjustment device as defined in claim 1, further including a clamping jawlike device for mounting said housing shaft means and by means of which a tool limited by two planar surfaces can be laterally clamped, whereby the axis of rotation of said housing shaft means is situated in the central plane of the clamping width.

5. An axial alignment adjustment device as defined in claim 1, wherein the body of said housing is provided with openings in such a way that in the direction of the transmission of movement of the slide member upon said dial gauge and at right angles thereto aligning rod means can be inserted for facilitating the angular position of the apparatus with respect to the object which is to be adjusted.

6. An axial alignment adjustment device as defined in claim 1, further including spreader element means for the concentric determination of cylindrical bores, said spreader element means being constructed in such a way that at the head of this spreader element means there are disposed a number of bolt members of equal length situated in the plane of rotation which are pressed towards the outside by the cone apex of a spring-biased bolt which is concentrically guided at the axis of rotation of the housing of said spreader element means, in order to produce an exact concentric form-locking connection with the axis of rotation of the slide member.

7. An axial alignment adjustment device as defined in claim 1, further including means for axially resiliently mounting said feeler elements at said housing.

8. An axial alignment adjustment apparatus for aligning an object with respect to the axis of rotation of a spindle of a machine tool, comprising a housing, shaft means for securing said housing to said spindle, a slide member, exchangeable feeler elements carried by said slide member, a locking device for exchangeably securing said feeler elements to said slide member, said slide member being mounted at said housing for displacement through a predetermined amount radially with respect to the axis of the spindle and rotatable about such spindle axis, a dial gauge for reading off said displacements of said slide member, a feeler device mounted internally of said housing for actuating said dial gauge, means for resiliently mounting in axial direction said feeler elements at said housing, said locking device embodies a pin member which is subject to spring force and displaceable radially at the slide member, said pin member having a beveled end which engages in a recess of the associated feeler element in such a fashion that by rotating the associated feeler element the end of said pin member is displaced back for the purpose of releasing the locking action.